Sept. 4, 1928. 1,683,406
J. G. PECK
ICE CREAM CABINET AND MEANS FOR AUTOMATICALLY MAINTAINING MORE THAN
ONE TEMPERATURE THEREIN SIMULTANEOUSLY
Filed June 9, 1925 3 Sheets-Sheet 1
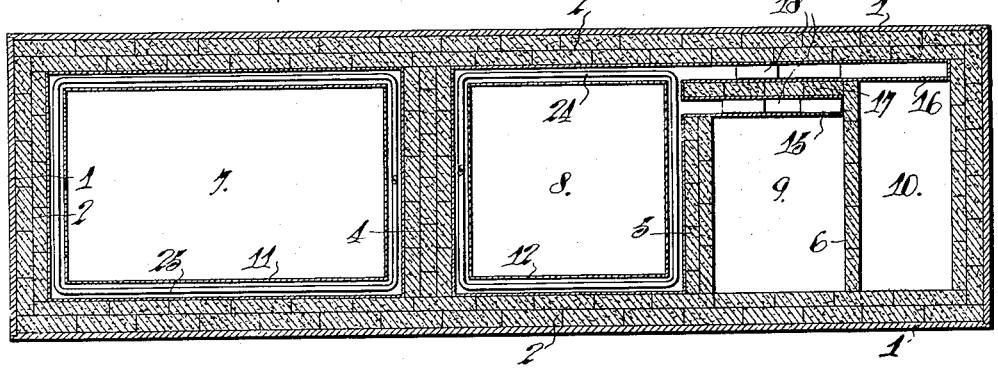
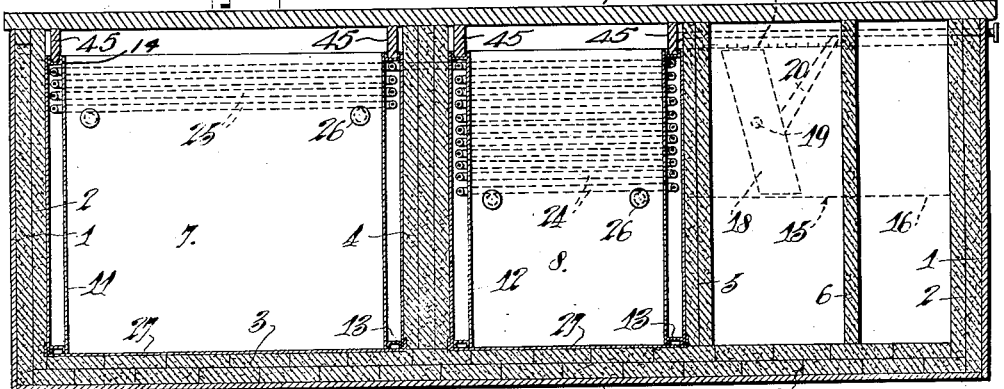
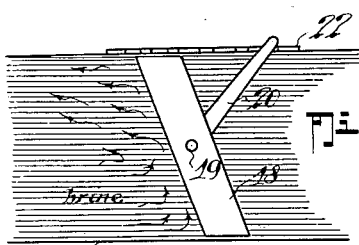
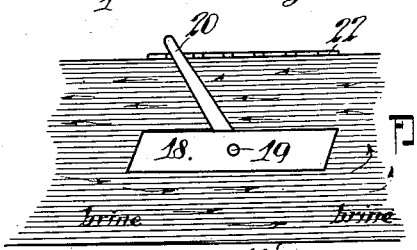
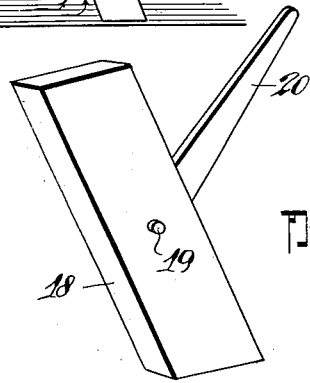
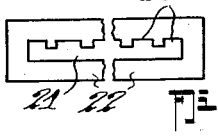
INVENTOR
Jacob G. Peck.
BY
Albert E. Dietrich
ATTORNEY

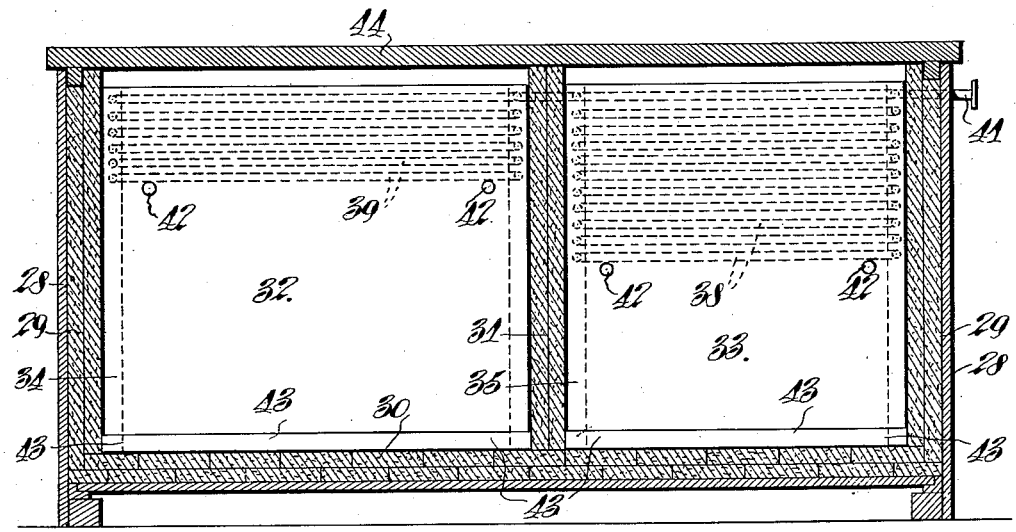
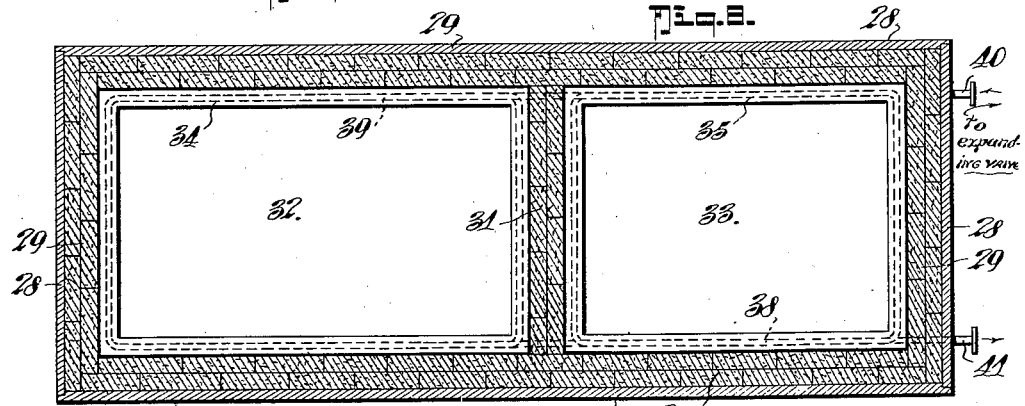
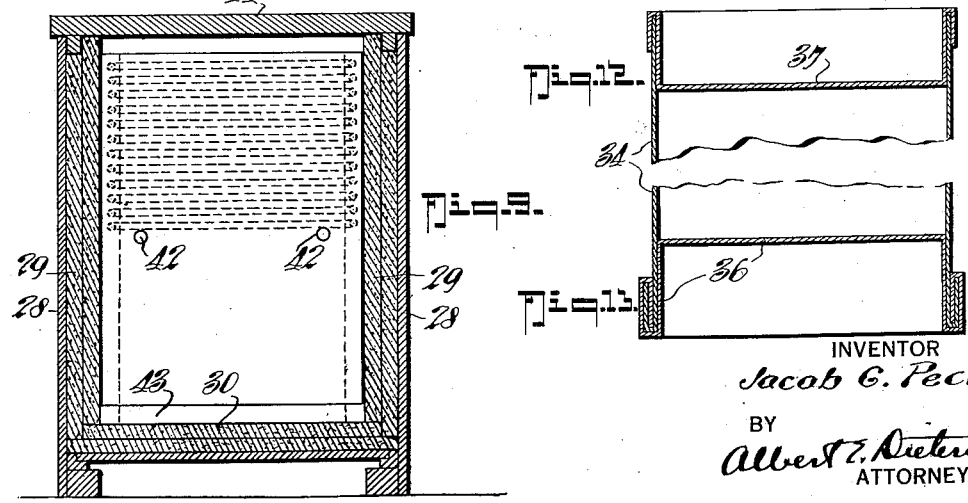

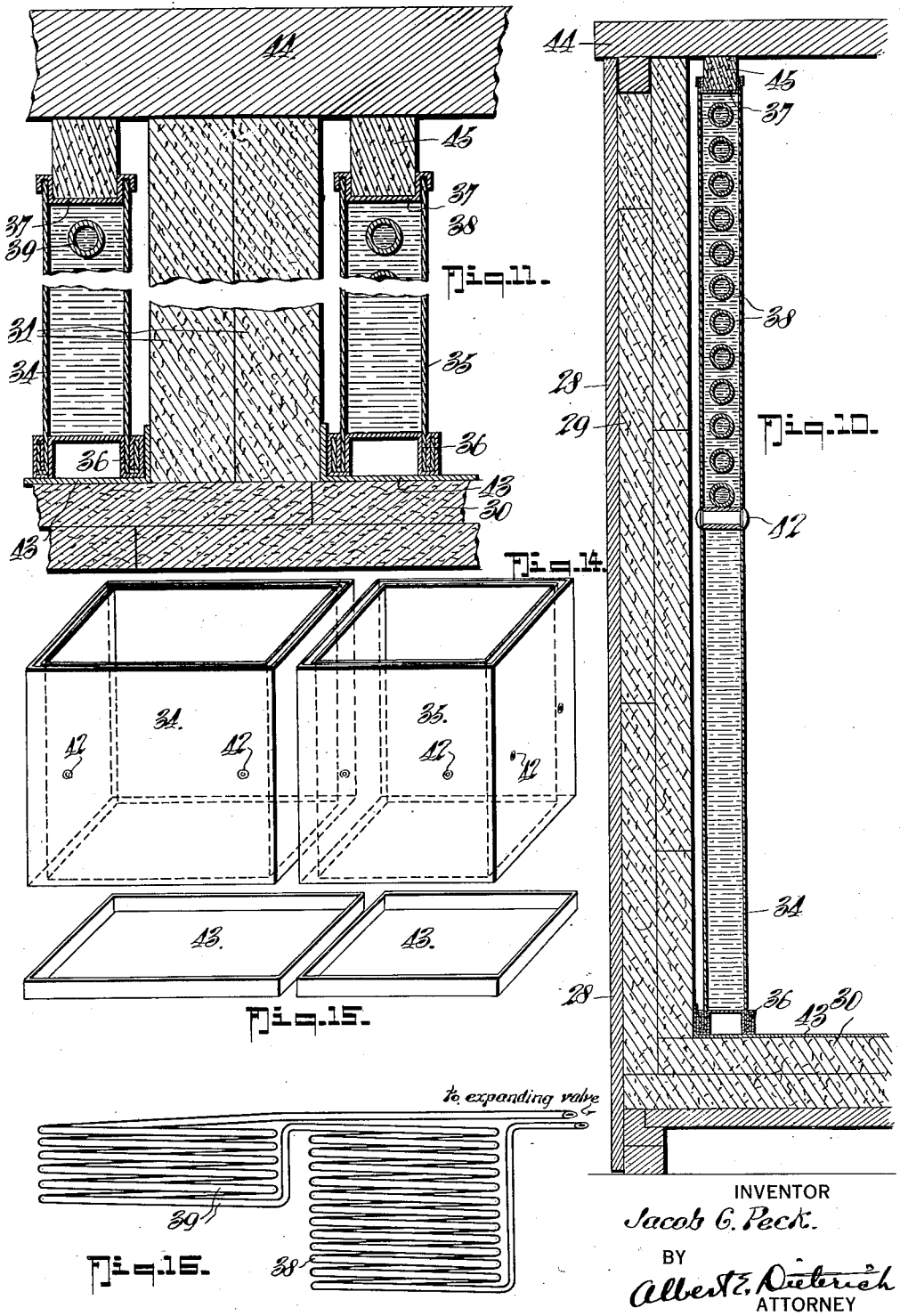

Patented Sept. 4, 1928.

1,683,406

UNITED STATES PATENT OFFICE.

JACOB G. PECK, OF PORTLAND, OREGON.

ICE-CREAM CABINET AND MEANS FOR AUTOMATICALLY MAINTAINING MORE THAN ONE TEMPERATURE THEREIN SIMULTANEOUSLY.

Application filed June 9, 1925. Serial No. 35,996.

The invention generally relates to mechanical refrigeration and primarily has for its object to provide a multi-temperature ice cream cabinet in which the desired and varied temperatures of the several compartments of the cabinet are automatically controlled under all conditions.

Mechanical refrigerating devices are rapidly coming into favor but, to my knowledge, no practically successful multi-temperature cabinet, in which the various temperatures are effectively created simultaneously by the same operation, have been provided. My invention, hereinafter disclosed, provides a simple economic cabinet construction which will accomplish the desired purposes above related and in which brine jackets and cooling coils are employed and are so constructed and arranged as to provide the desired refrigeration with a minimum loss of storage space.

Prior to the present time the trade has been satisfied with one temperature cabinets for their ice cream, but now the brick and package sales have so increased that at least two-temperature cabinets are practically necessary, and multi-temperature cabinets are desirable for soda-fountain use.

The proper temperatures at which ice cream should be kept are, for brick cream, approximately 5 degrees below zero, and for bulk cream, from 5 to 10 degrees above.

Under the old ice and salt cabinet uses the temperature is never kept uniform but runs all the way from zero to 20 degrees above, or over an even wider temperature variation, the ice cream being all the same temperature, whether brick or bulk, and is too cold at one time and too warm at another. Such cream storage breaks down the texture of the cream, making it uneven and, in addition, causing it to lose its flavor considerably.

It will also be obvious that any one-temperature cabinet is impractical for storing both brick and bulk cream. If the single temperature of the cabinet is such to make possible the storing of bulk cream in condition for being scooped up, the brick cream is too soft to carry home, and, if the cabinet is made cold enough to properly store the brick cream, the bulk cream is too hard to enable its being scooped out for serving.

With the above and other objects in view that will hereinafter appear the invention still further resides in the novel details of construction, combination and arrangement of parts, all of which will be first fully described then be particularly pointed out in the appended claims, reference being had to the accompanying drawings, in which:—

Figure 1 is a horizontal section of a multi-temperature cabinet for soda-fountain use.

Figure 2 is a vertical longitudinal section of the cabinet shown in Figure 1.

Figures 3 and 4 are diagrammatic views illustrating the operation of one of the control gates.

Figure 5 is a perspective view of one of the control gates.

Figure 6 is a detail plan view illustrating one of the holding plates cooperative with the control gates.

Figure 7 is a vertical longitudinal section of a two-temperature cabinet constructed in accordance with my invention.

Figure 8 is a horizontal section of the cabinet shown in Figure 7.

Figure 9 is a vertical cross section of the cabinet shown in Figure 7.

Figure 10 is an enlarged vertical cross section of one end wall of the cabinet.

Figure 11 is an enlarged vertical cross section illustrating the top and bottom portions of the central partition wall of the cabinet.

Figures 12 and 13 are enlarged diagrammatic cross sections illustrating the top and bottom edge structures of one of the brine jackets respectively.

Figure 14 is a detail perspective view of the brine jackets.

Figure 15 is a detail perspective view of the brine jacket pans.

Figure 16 is a somewhat diagrammatic side elevation of the expansion coil.

In the drawings, I have shown two embodiments of the invention; viz, a multi-temperature cabinet (4 chambers being shown) in Figures 1-6, and a simple two-temperature cross divided cabinet (2 chambers being shown) in Figures 7-9.

Referring to Figures 1-6 of the drawings 1 indicates a suitable encasing housing, which may be constructed of wood, metal, vitrolite or other suitable material, and 2 suitably cork insulated end and side walls, which, together with the suitably cork insulated bottom 3 and the suitably cork insulated cross partition 4 and similar intermediate partitions 5 and 6, serve to provide a large bulk cream storage compartment, a smaller brick cream storage compartment and supplemental storage chambers 9 and 10 varying in size according to the sequence of the numerals, larger and smaller.

An open rectangular thin walled brine jacket 11 is mounted in the chamber 7 in a manner for lying closely adjacent the walls 2 so as to provide a maximum of storage space inside the said jacket, and a similar brine jacket 12 is similarly mounted in the chamber 8. The bottom of the brine jackets are securely sealed as at 13 and the tops thereof closed by the removable covers 14 to facilitate the pouring into and the retention of the brine in said jackets. See Figures 12 and 13.

The brine jacket 12 is provided with longitudinally extended vertically positioned flat conduits or wing-like extensions 15 and 16, the former extending into the end of the chamber 9, and the latter into the chamber 10, an insulator wall 17 serving to separate and render individual the temperatures of said chambers.

The chilled brine in the jacket 12 communicates with the extension 15 and 16 and serves to cool the chambers 9 and 10 into which they project. See Figures 1 and 2.

In order to effectively control the temperatures of the chambers 9 and 10, (by permitting, controlling or preventing circulation of chilled brine therein) to vary the same at will, I provide a control gate 18 in each which may be moved on their pivotal connections 19 to admit or prevent circulation of chilled brine in the ends of the extensions 15 and 16. The gates 18 may be in the nature of cork filled metal containers. A control handle 20 is connected to each control gate and projects upwardly through a slot 21 in a control plate 22 having suitable holder notches 23 for holding the handle at its adjusted positions. See Figures 1–6.

A large chilling agent circulating coil 24 is mounted in the brine jacket 8 and a smaller coil 25 is mounted in the jacket 7, both coils being in circulating communication and having suitable inlet and outlet ends extending from the cabinet. Any suitable chilling agent is circulated through the coils to serve to chill the brine therein for obvious purposes.

Stay bolts 26 serve both to space the walls of the brine jackets and to support the coils therein.

Drain pans numbered 27 in Figure 2 are loosely mounted one in the bottom of each chamber 7 and 8, in which the brine jackets are mounted, and which serve to collect all drainage due to the melting of any frost which might collect on the walls of said brine jackets.

In the form of the invention shown in Figures 7–9, 28 indicates the housing, 29 the insulated side and end walls, 30 the bottom and 31 an intermediate cross wall of cork or other suitable insulating material which serves to divide the cabinet into a bulk cream storing chamber 32 and a brick cream storing chamber 33.

Brine jackets 34 and 35, constructed and arranged as indicated in Figures 7, 8, 12, 13 and 14 are provided and have their upper open ends closed by the removable closure caps 37. Large and small coils 38 and 39 are mounted in the jackets 35 and 34 respectively and serve to cool the chambers 33 and 32 to temperatures according to the size of said coils. The coils are in circulating communication one with the other and suitable inlet and outlets 40 and 41 are provided and extend from the cabinet to facilitate such circulation.

As in the embodiment first described, drain pans 43 are positioned beneath and with the up-turned edges thereof surrounding the brine jackets.

The cabinet may be provided with a suitable closure top 44 and flanges 45 of cork or the like may be fitted in the channels provided in the closure caps 37 to serve as a means of insulating the tops of the brine jackets, to assist in stiffening the said caps 37, and also, if it be desired and they are extended high enough, to assist in supporting the said closure top 44.

I am aware that there are cabinets on the market that hold a brine solution but they all have impractically large brine spaces which leave relatively small space for ice cream storage.

My cabinet is the only one, to my knowledge, that has a thin walled brine jacketing holding not over 25 gallons of brine and capable of storing 50 gallons of ice cream. Also, in my cabinet, there being no brine jacketing in the bottom thereof, if any ice cream cans are dropped thereinto no damage can result.

The open square, varied sized and communicating expansion coils of my cabinet are submerged in the brine solution in the brine jackets and are adapted for connection with any refrigeration machine for circulating any suitable refrigerant through said coils.

I find that by making the brine jackets separate as illustrated, the temperature of each is much better controlled and individually maintained and may be suitably insulated against dissipation.

The pans beneath the brine jackets in the main compartments or chambers being loose, no harm will come to the brine jacket should a full ice cream can be dropped to the bottom of one of such compartments.

There are two systems used in refrigerating plants. One is what is called the dry system of refrigeration and one is called the flooded system. I think I am the first one to use a flooded system where two coils are connected together in two separate compartments and controlled by one expansion or reducing valve whereby two separate and distinct temperatures are maintained. The flooded system is much more efficient. The following is a description of both the flooded and dry systems:—

In an expansion coil a liquid refrigerating medium is admitted through an expansion or reducing valve from a higher to a lower pressure. In going from a higher to a lower pressure the liquid absorbs heat and expands into a gas which is then pumped out of the expansion coil by a compressor and recompressed and then cooled until it liquefies, losing the heat which it absorbed in the expansion coil. The heat taken up by the expanding gas is supplied by the room or compartment in which the expansion coil is located. The liquid cannot turn into gas unless it is heated or the pressure removed. In an expanding coil, we do both. An expanding valve reduces the pressure and the article to be cooled supplies the heat.

In a dry system the refrigerating medium is admitted just fast enough to be all turned into a gas when it leaves the expansion coil. The liquid is admitted to the top of the coil and drawn off as gas at the bottom. However, it is difficult to regulate the flow of liquid so it will all have turned into a gas, so none of the liquid particles will be drawn into the compressor—as any liquid being pumped has not done any work and may injure the compressor. In the dry system most of the coils, especially the last portion, are in contact with a dry gas in which condition less heat is absorbed than when the surfaces are wet. Where the liquid is fed from top of coil and too much is going through, the velocity of the gas flow as well as gravity will carry liquid over into machine and cause it to pound. So the flooded system has been developed which differs by having the liquid admitted at the bottom and drawn off from the top.

In the flooded system there is always some liquid in the bottom layers of pipe. As the pressure is reduced and heat supplied, the liquid turns into gas bubbles which pass up through the liquid and to the top of coil and thence to compressor. This action keeps the inside of coil in a moist or wet condition. Where we have a wet surface on one side and a liquid on the other the greatest heat transfer takes place and hence is most efficient.

In my structure the coil is immersed in a brine solution and made in a double form. It is fed to the bottom of the larger coil and over into the bottom of the smaller coil. Most of the liquid is in the larger coil and any liquid going over is fed to the bottom of smaller coil and there expanded into gas. By proportioning the size of the two coils, I attain and hold a certain and definite temperature in the compartments in which the coils are placed.

Where the pipes from an expansion coil go direct to a compressor, liquid is often carried over so a collector or accumulator is placed in the pipe line to trap any liquid. My double coil serves the purpose of an accumulator and has not been used in this way nor for the purpose as shown.

From the foregoing description, taken in connection with the accompanying drawings, it is thought the novel details of construction, manner of operation and advantages of my invention will be readily apparent to those skilled in the art to which it relates.

What I claim is:—

1. A cabinet of the class described comprising a suitably insulated encasing housing including side and end walls, a bottom, and partitions for forming a plurality of compartments, brine reservoirs in certain of the compartments, each reservoir comprising an open ended body composed of thin hollow walls adapted to retain brine within said walls, a cooling coil in the hollow walls of each body, the coil of one body being of greater capacity than that of an adjacent body, the walls of each said body lying in close proximity to the coils, whereby to provide brine holders of relatively small brine capacity but large surface area and whereby said hollow-walled bodies will encase a maximum of storage space.

2. A cabinet of the class described comprising a suitably insulated encasing housing including side and end walls, a bottom, and partitions for forming a plurality of compartments, brine reservoirs in certain of the compartments, each reservoir comprising an open ended body composed of thin hollow walls adapted to retain brine within said walls, a cooling coil in the hollow walls of each body, the coil of one body being of greater capacity than that of an adjacent body, the walls of each said body lying in close proximity to the coils, whereby to provide brine holders of relatively small brine capacity but large surface area, whereby said hollow-walled bodies will encase a maximum of storage space, and stay bolts for spacing the hollow walls of the bodies and for supporting the coils therein.

3. A cabinet of the class described comprising a suitably insulated encasing housing including side and end walls, a bottom, and partitions for forming a plurality of compartments, brine reservoirs in certain of the compartments, each reservoir comprising an open ended body composed of thin hollow walls adapted to retain brine within said walls, a cooling coil in the hollow walls of each body, the coil of one body being of greater capacity than that of an adjacent body, the walls of each said body lying in close proximity to the coils, whereby to provide brine holders of relatively small brine capacity but large surface area, whereby said hollow-walled bodies will encase a maximum of storage space, and a pan mounted in each compartment having a brine reservoir therein and in which pans said reservoirs rest for the purposes specified.

4. A cabinet of the class described comprising a suitably insulated encasing housing including side and end walls, a bottom, and partitions for forming a plurality of compartments, brine reservoirs in certain of the compartments, each reservoir comprising an open ended body composed of thin hollow walls closed at the bottom and open at the top and adapted to retain brine within said walls, a cooling coil in the hollow walls of each body, the coil of one body being of greater capacity than that of an adjacent body, the walls of each said body lying in close proximity to the coils, whereby to provide brine holders of relatively small brine capacity but large surface area, whereby said hollow-walled bodies will encase a maximum of storage space, means for covering the compartments, trough-shaped covers for the hollow walled reservoirs, insulating flanges carried by the trough-shaped covers and projected to position for being engaged by the compartment covering means for the purposes specified.

5. A cabinet of the class described comprising a suitably insulated encasing housing including side and end walls, a bottom, and partitions for forming a plurality of compartments, brine reservoirs in certain of the compartments, each reservoir comprising an open ended body composed of thin hollow walls adapted to retain brine within said walls, a cooling coil in the hollow walls of each body, the coil of one body being of greater capacity than that of an adjacent body, flat conduits extending from at least one reservoir body into certain other compartments and having brine flow communication with said reservoir body for the purposes specified.

6. A cabinet of the class described comprising a suitably insulated encasing housing including side and end walls, a bottom, and partitions for forming a plurality of compartments, brine reservoirs in certain of the compartments, each reservoir comprising an open ended body composed of thin hollow walls adapted to retain brine within said walls, a cooling coil in the hollow walls of each body the coil of the one body being of greater capacity than that of an adjacent body, flat conduits extending from at least one reservoir body into certain other compartments and forming part of one limiting wall of the compartments into which they are extended, and having brine flow communication with said reservoir body for the purposes specified.

7. A cabinet of the class described comprising a suitably insulated encasing housing including side and end walls, a bottom, and partitions for forming a plurality of compartments, brine reservoirs in certain of the compartments, each reservoir comprising an open ended body composed of thin hollow walls adapted to retain brine within said walls, a cooling coil in the hollow walls of each body, the coil of one body being of greater capacity than that of an adjacent body, flat conduits extending from at least one reservoir body into certain other compartments and having brine flow communication with said reservoir body, and a pivoted gate valve in each wing extension for controlling the flow of brine therein.

8. A cabinet of the class described comprising a suitably insulated encasing housing including side and end walls, a bottom, and partitions for forming a plurality of compartments, brine reservoirs in certain of the compartments, each reservoir comprising an open ended body composed of thin hollow walls adapted to retain brine within said walls, a cooling coil in the hollow walls of each body, the coil of one body being of greater capacity that that of an adjacent body, flat conduits extending from at least one reservoir body into certain other compartments, and having brine flow communication with said reservoir body, a pivoted gate valve in each wing extension for controlling the flow of brine therein, an operating arm for each valve projected to the top of the cabinet, and means for securing the arm at adjusted positions.

JACOB G. PECK.